United States Patent
Ye et al.

(10) Patent No.: US 12,331,499 B2
(45) Date of Patent: Jun. 17, 2025

(54) PULL-OUT FAUCET AND WATER OUTLET PANEL ASSEMBLY CONFIGURED TO BE CONNECTED TO PULL-OUT FAUCET

(71) Applicant: Xiamen Lota International Co., Ltd., Fujian (CN)

(72) Inventors: Liming Ye, Fujian (CN); Shuanglin Bai, Fujian (CN); Chuanbao Zhu, Fujian (CN)

(73) Assignee: Xiamen Lota International Co., Ltd., Fujian (CN)

( * ) Notice: Subject to any disclaimer, the term of this patent is extended or adjusted under 35 U.S.C. 154(b) by 109 days.

(21) Appl. No.: 18/369,771

(22) Filed: Sep. 18, 2023

(65) Prior Publication Data

US 2024/0271398 A1 Aug. 15, 2024

(30) Foreign Application Priority Data

Feb. 14, 2023 (CN) .......................... 202310111135.4

(51) Int. Cl.
*E03C 1/04* (2006.01)
*F16K 11/00* (2006.01)
*F16K 27/00* (2006.01)

(52) U.S. Cl.
CPC .......... *E03C 1/0412* (2013.01); *E03C 1/0403* (2013.01); *F16K 11/00* (2013.01); *F16K 27/00* (2013.01); *E03C 2001/0415* (2013.01); *E03C 2001/0417* (2013.01)

(58) Field of Classification Search
CPC ................. E03C 1/0412; E03C 1/0403; E03C 2001/0415; E03C 2001/0417; F16K 11/00; F16K 27/00
USPC ......................................................... 137/801
See application file for complete search history.

(56) References Cited

U.S. PATENT DOCUMENTS

| 6,757,921 B2 * | 7/2004 | Esche ....................... E03C 1/04 4/677 |
| 9,062,438 B2 * | 6/2015 | Bares ........................ E03C 1/04 |
| 10,234,049 B1 * | 3/2019 | He ........................ F16K 31/605 |
| 2021/0079633 A1 * | 3/2021 | Lu .......................... E03C 1/0403 |

* cited by examiner

*Primary Examiner* — John Bastianelli
(74) *Attorney, Agent, or Firm* — Cooper Legal Group, LLC

(57) ABSTRACT

A water outlet panel assembly configured to be connected to a pull-out faucet comprises a water outlet panel, an adapter member, and a control member. The water outlet panel is detachably connected to a faucet body of the pull-out faucet, and the water outlet panel comprises a water outlet port. The adapter member comprises a water inlet, a first water outlet, and a second water outlet, and the water inlet and the first water outlet are detachably connected to a pull-out pipe of the pull-out faucet. When the second water outlet is controlled to be in communication with the water outlet port by the control member, the first water outlet is controlled to be closed by the adapter member, and when the second water outlet is controlled not to be in communication with the water outlet port by the control member, the first water outlet is controlled to be opened.

19 Claims, 6 Drawing Sheets

PULL-OUT FAUCET AND WATER OUTLET PANEL ASSEMBLY CONFIGURED TO BE CONNECTED TO PULL-OUT FAUCET

RELATED APPLICATIONS

This application claims priority to Chinese patent application number 202310111135.4, filed on Feb. 14, 2023. Chinese patent application number 202310111135.4 is incorporated herein by reference.

FIELD OF THE DISCLOSURE

The present disclosure relates to a pull-out faucet and a water outlet panel assembly configured to be connected to the pull-out faucet.

BACKGROUND OF THE DISCLOSURE

Existing pull-out faucets comprise a faucet housing, a valve seat, and a valve core. The valve seat is arranged inside the faucet housing, and the valve core is arranged inside the faucet housing and connected to the valve seat. The pull-out faucet also comprises a hot water pipe and a cold water pipe extending from a bottom of the faucet housing, and the hot water pipe and cold water pipe are respectively connected to the valve seat to be in fluid communication with the valve core, which controls the mixture of hot and cold water flowing out from a single pull-out tube. In this faucet structure, only one water outlet terminal that is connected to the pull-out tube is arranged. Although multi-outlet faucets have been developed, the multi-outlet faucets involve significant modifications to the original pull-down faucet structure and the addition of switching mechanisms, which cannot be directly attached to an original faucet.

BRIEF SUMMARY OF THE DISCLOSURE

The present disclosure provides a pull-out faucet and a water outlet panel assembly configured to be connected to the pull-out faucet to solve the deficiencies in the background.

In order to solve the technical problem, a first technical solution of the present disclosure is as follows.

A water outlet panel assembly configured to be connected to a pull-out faucet comprises a water outlet panel, an adapter member, and a control member. The water outlet panel is detachably connected to a faucet body of the pull-out faucet, and the water outlet panel comprises a water outlet port. The adapter member comprises a water inlet, a first water outlet, and a second water outlet, and the water inlet and the first water outlet are detachably connected to a pull-out pipe of the pull-out faucet. The control member is connected to the second water outlet and the water outlet port of the water outlet panel to be configured to control the second water outlet alternatively to be or not to be in communication with the water outlet port. When the second water outlet is controlled to be in communication with the water outlet port by the control member, the first water outlet is controlled to be closed by the adapter member, and when the second water outlet is controlled not to be in communication with the water outlet port by the control member, the first water outlet is controlled to be opened by the adapter member.

In a preferred embodiment, the water inlet of the adapter member is disposed with a first one of first connectors, and the first water outlet of the adapter member is disposed with a first one of second connectors. The pull-out pipe comprises a first pipe body and a second pipe body, and a first end of the first pipe body is connected to a water outlet of the pull-out faucet. A second end of the first pipe body is disposed with a second one of the second connectors, and a first end of the second pipe body is connected to a water outlet terminal of the pull-out faucet. A second end of the second pipe body is disposed with a second one of the first connectors, and the first connectors are configured to be detachably connected to the second connectors.

In a preferred embodiment, the adapter member comprises a cavity, a movable switching member, and an elastic member, and the cavity is respectively connected to the water inlet, the first water outlet, and the second water outlet. The movable switching member is movably disposed in the cavity to move between a first position for blocking the first water outlet and a second position for unblocking the first water outlet, and the elastic member abuts the movable switching member. When the second water outlet is controlled not to be in communication with the water outlet port by the control member, the movable switching member is pushed by a water pressure in the cavity to overcome an elastic force of the elastic member so as to enable the movable switching member to be moved to the second position, and when the second water outlet is controlled to be in communication with the water outlet port by the control member, the movable switching member is pushed by the elastic force of the elastic member to be moved to the first position.

In a preferred embodiment, the movable switching member comprises a first bearing surface facing the second water outlet and a second bearing surface facing the first water outlet, and an area of the first bearing surface is larger than an area of the second bearing surface.

In a preferred embodiment, the movable switching member comprises a shaft, a first sealing gasket, and a second sealing gasket, and the shaft is configured to be moved to drive the first sealing gasket to block the first water outlet. The second sealing gasket comprises the first bearing surface and the second bearing surface, and the first sealing gasket and the second sealing gasket are coaxially disposed at two ends of the shaft.

In a preferred embodiment, the pull-out pipe comprises a droop section connected to a water outlet of the pull-out faucet and a rising section connected to a water outlet terminal of the pull-out faucet, and the water inlet and the first water outlet are detachably connected to the droop section of the pull-out pipe of the pull-out faucet.

In a preferred embodiment, the water outlet panel comprises a top wall, a surrounding wall, and a bottom wall, and the surrounding wall comprises the water outlet port. The bottom wall comprises a water inlet port, and the control member is connected to the water inlet port. The water outlet port comprises a plurality of water outlet holes arranged at intervals.

In a preferred embodiment, the water outlet panel comprises a through hole penetrating therethrough, and a bottom of the faucet body of the pull-out faucet is configured to be connected to the through hole.

Compared with the existing techniques, the technical solution has the following advantages.

1. The water outlet panel is detachably connected to a faucet body of the pull-out faucet, and the water outlet panel comprises a water outlet port. The adapter member comprises a water inlet, a first water outlet, and a second water outlet, and the water inlet and the first water outlet are detachably connected to a pull-out pipe of the pull-out faucet. The control member is connected to the second water outlet and the water outlet port of the water outlet panel to be configured to control the second water outlet alternatively to be or not to be in communication with the water outlet port. When the second water outlet is controlled to be in communication with the water outlet port by the control member, the first water outlet is controlled to be closed by the adapter member, and when the second water outlet is controlled not to be in communication with the water outlet port by the control member, the first water outlet is controlled to be opened by the adapter member.

The water outlet panel assembly can be attached to an original pull-out faucet without making any changes to a structure of the pull-out faucet. With the water outlet panel assembly, the original pull-down faucet can switch between the water outlet port and the water outlet terminal without the need for additional water control mechanisms.

2. The water inlet of the adapter member is disposed with a first one of first connectors, and the first water outlet of the adapter member is disposed with a first one of second connectors. The pull-out pipe comprises a first pipe body and a second pipe body, and a first end of the first pipe body is connected to a water outlet of the pull-out faucet. A second end of the first pipe body is disposed with a second one of the second connectors, and a first end of the second pipe body is connected to a water outlet terminal of the pull-out faucet. A second end of the second pipe body is disposed with a second one of the first connectors, and the first connectors are configured to be detachably connected to the second connectors. Therefore, the adapter member can be conveniently connected to the pull-out pipe.

3. The pull-out pipe comprises a droop section connected to the water outlet of the pull-out faucet and a rising section connected to the water outlet terminal of the pull-out faucet. The water inlet and the first water outlet are detachably connected to the droop section of the pull-out pipe of the pull-out faucet. When the pull-out pipe is pulled out, the rising section rises and does not affect the droop section, so that the loosening and other problems caused by frequent movement of the adapter member can be prevented.

DETAILED DESCRIPTION OF THE EMBODIMENTS

The present disclosure will be further described below in combination with the accompanying drawings and embodiments.

Figure 1:
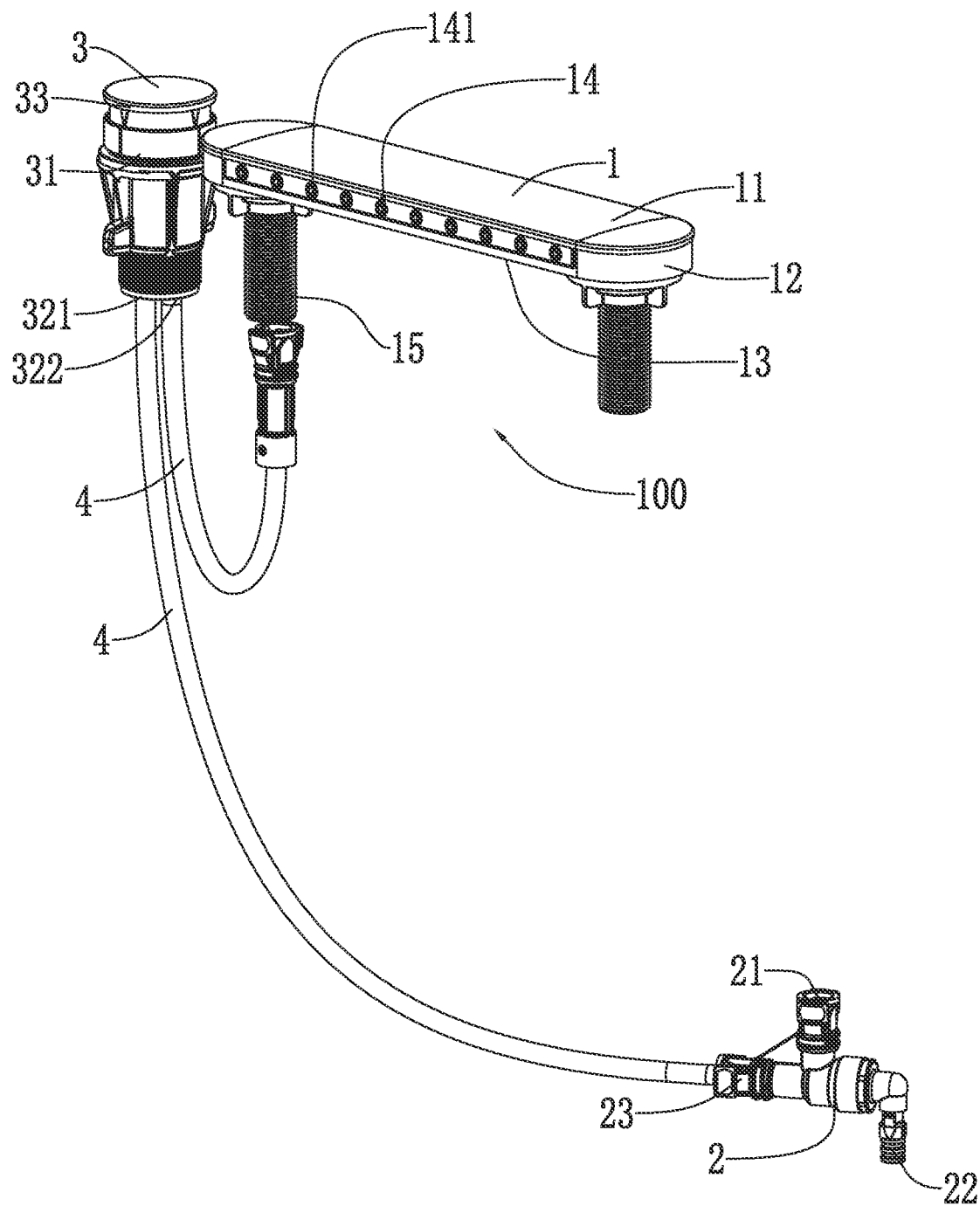
FIG. 1 illustrates a perspective view of a water outlet panel assembly in a preferred embodiment of the present disclosure.
Figure 2:
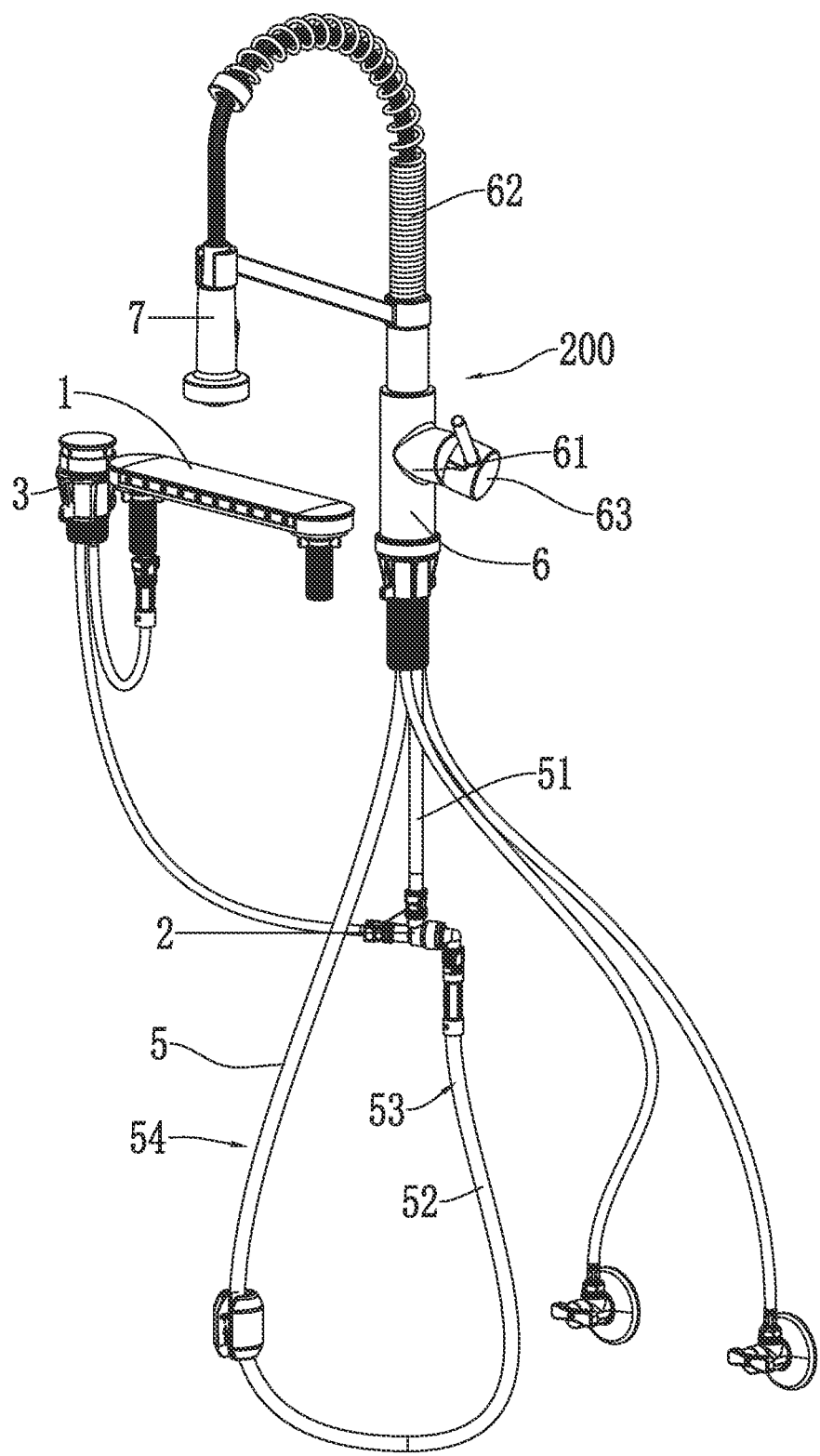
FIG. 2 illustrates a perspective view of the water outlet panel assembly connected to a pull-out faucet in a preferred embodiment of the present disclosure.
Figure 3:
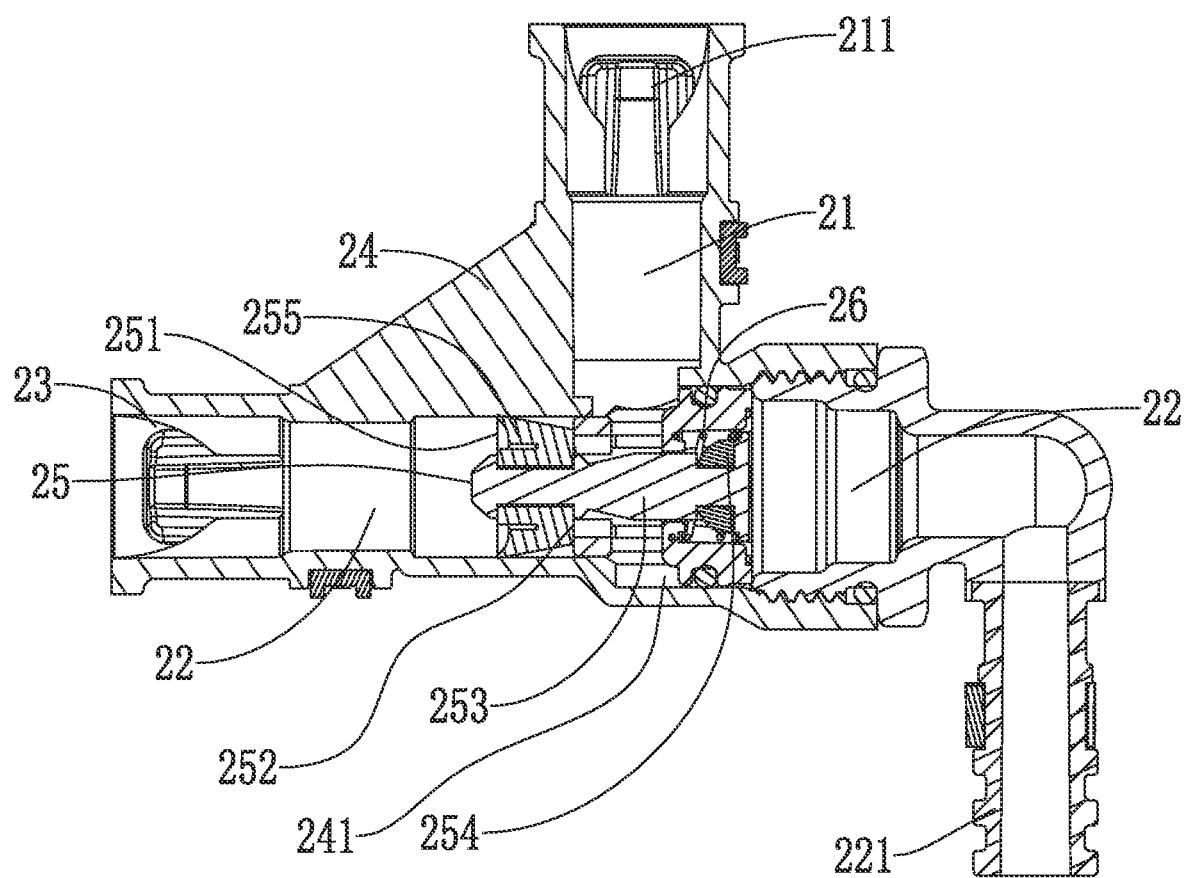
FIG. 3 illustrates a cross-sectional view of an adapter member in a preferred embodiment of the present disclosure.
Figure 4:
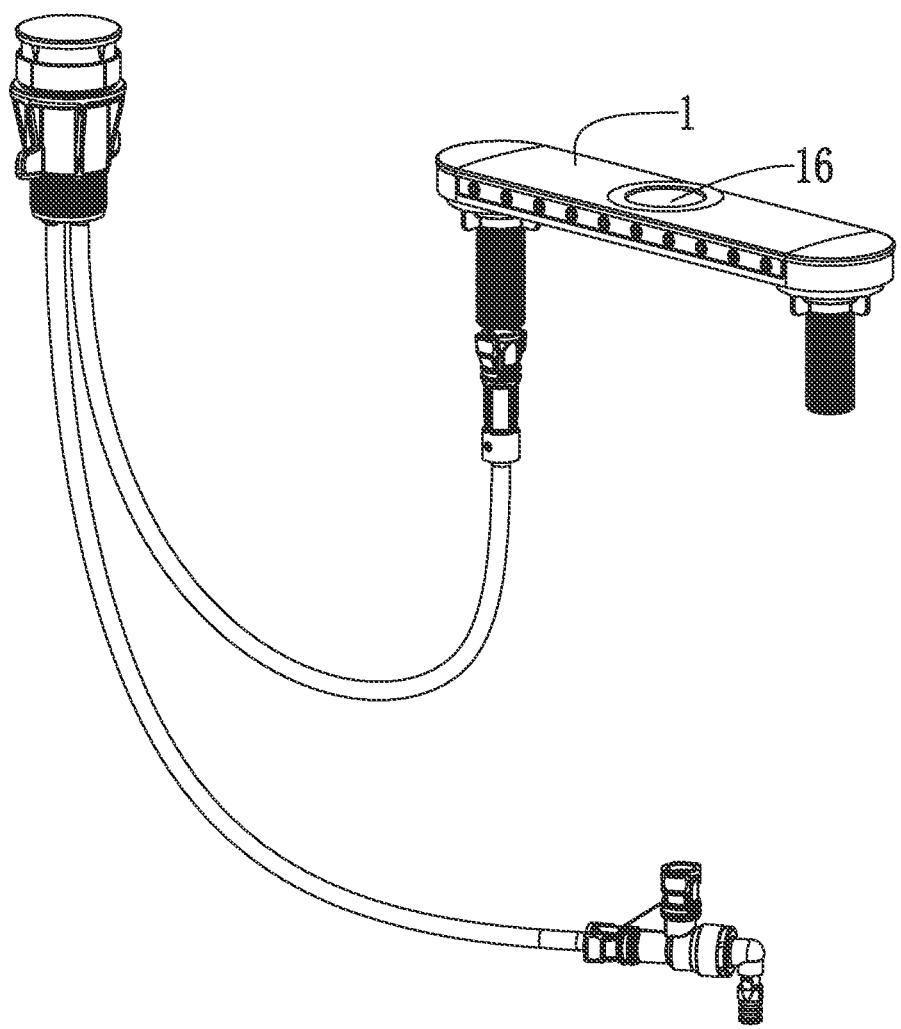
FIG. 4 illustrates a perspective view of a water outlet panel having a through hole in a preferred embodiment of the present disclosure.
Figure 5:
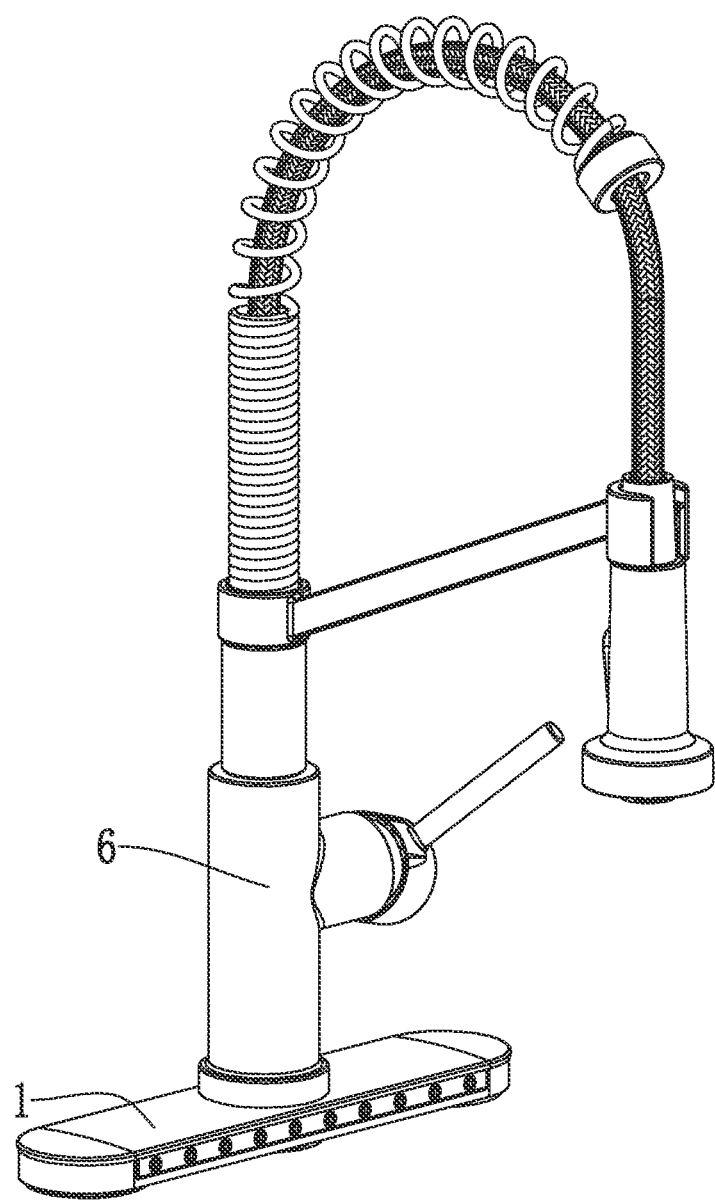
FIG. 5 illustrates a perspective view of the water outlet panel having the through hole and connected to the pull-out faucet in a preferred embodiment of the present disclosure.
Figure 6:
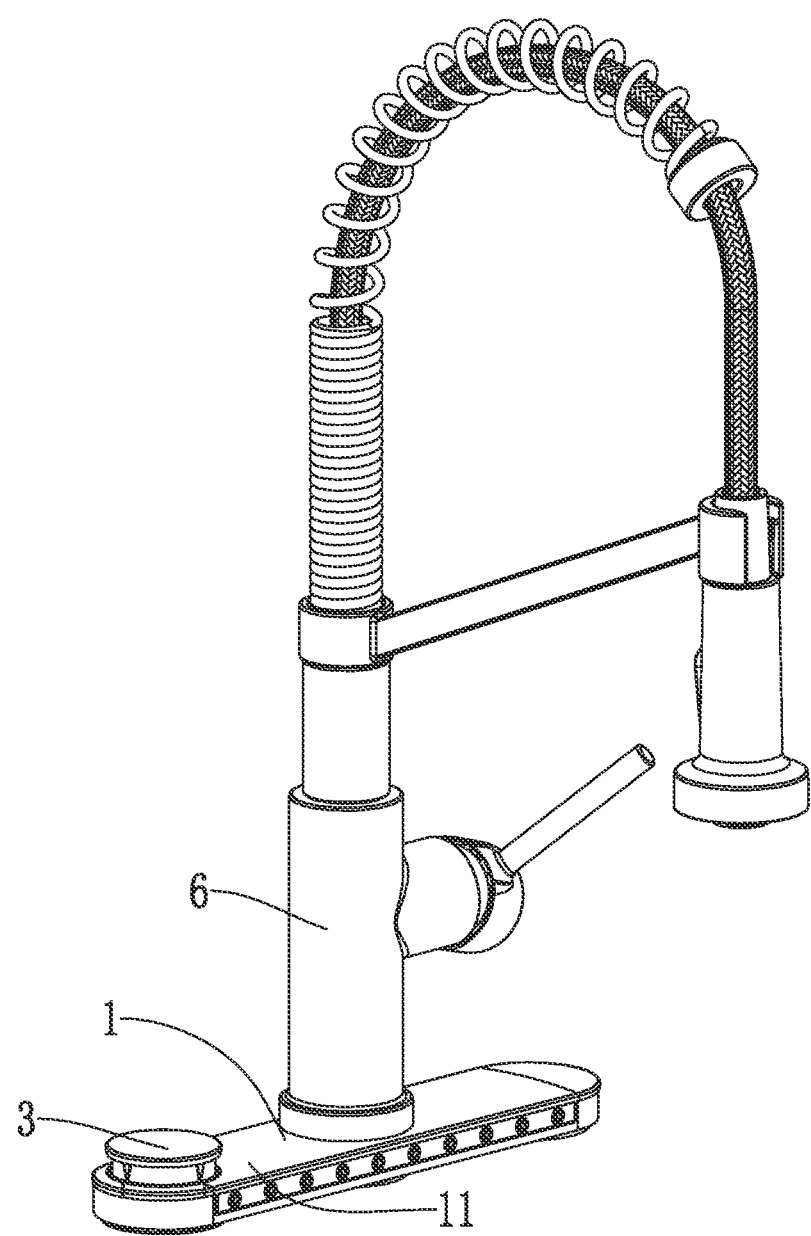
FIG. 6 illustrates a perspective view of the water outlet panel with a control member disposed thereon in a preferred embodiment of the present disclosure.

Referring to FIGS. 1-6, a water outlet panel assembly 100 configured to be connected to a pull-out faucet 200 is provided, and the water outlet panel assembly 100 comprises a water outlet panel 1, an adapter member 2, and a control member 3.

The water outlet panel 1 comprises a top wall 11, a surrounding wall 12, and a bottom wall 13. The water outlet panel 1 is substantially in an oval shape. The top wall 11 plays a role of a decoration panel, and the top wall 11 has the same color and material as the pull-out faucet 200. The bottom wall 13 is parallel to the top wall 11, and the bottom wall 13 is used for being placed on a countertop of a water tank (i.e., a sink). The water outlet panel 1 is detachably connected to a faucet body 6 of the pull-out faucet 200, and the water outlet panel 1 and the faucet body 6 can be independently disposed at different positions of the countertop of the water tank to achieve water spraying of a larger range. The water outlet panel 1 comprises a water outlet port 14 disposed on the surrounding wall 12, and the water outlet port 14 is arranged on a long side (i.e., extending along a length direction of the water outlet panel 1) of the surrounding wall 12. The water outlet port 14 comprises a plurality of water outlet holes 141 disposed along the long side at intervals, and the water outlet port 14 forms a water flow with larger width through the plurality of water outlet holes 141 to achieve large-area water spraying to fall into the water tank in a horizontal projectile motion.

The pull-out faucet 200 comprises a pull-out pipe 5 and the faucet body 6, and the faucet body 6 comprises a faucet housing 61, a bent tube 62, and a valve assembly 63. The faucet housing 61 has a three-way pipe structure, and a bottom of the faucet housing 61 is disposed on the countertop of the water tank. The bent tube 62 is connected to a top of the faucet housing 61. The valve assembly 63 is disposed in the faucet housing 61, and the valve assembly 63 is connected to a hot water pipe and a cold water pipe and is configured to be controlled to form mixed water. A first end of the pull-out pipe 5 is connected to a water outlet of the valve assembly 63 (i.e., a water outlet of the pull-out faucet 200), and a second end of the pull-out pipe 5 is connected to a water outlet terminal 7 after passing through the faucet housing 61 and the bent tube 62. A user can grasp the water outlet terminal 7 to pull out the water outlet terminal 7, and the user can change a water outlet direction of the water outlet terminal 7.

The adapter member 2 comprises a water inlet 21, a first water outlet 22, and a second water outlet 23. The water inlet 21 and the first water outlet 22 are detachably connected to the pull-out pipe 5 of the pull-out faucet 200, and the control member 3 is connected to the second water outlet 23 and the water outlet port 14 of the water outlet panel 1 to be configured to control the second water outlet 23 alternatively to be or not to be in communication with the water outlet port 14. When the second water outlet 23 is controlled to be in communication with the water outlet port 14 by the control member 3, the first water outlet 22 is controlled to be closed by the adapter member 2. When the second water outlet 23 is controlled not to be in communication with the water outlet port 14 by the control member 3, the first water outlet 22 is controlled to be opened by the adapter member 2.

The control member 3 comprises a control housing 31 and a control valve body disposed in the control housing 31. The control valve body comprises a valve inlet 321 and a valve outlet 322, and the control valve body is an on-off valve. The valve inlet 321 is connected to the second water outlet 23 through a first one of water inlet pipes 4, the bottom wall 13 of the water outlet panel 1 comprises a water inlet port 15 connected to the water outlet port 14, and the valve outlet 322 is connected to the water inlet port 15 through a second one of the water inlet pipes 4. The control member 3 further comprises a handle 33 disposed on the control housing 31 and operatively coupled to the control valve body, and the user can control the valve inlet 321 alternatively to be or not to be in communication with the valve outlet 322 by operating the handle 33. In some simple alternatives, the control valve body may also be a solenoid valve or the like, and the handle 33 may be a touch switch or the like. In addition, referring to FIG. 6, the control member 3 may also be directly disposed on the top wall 11 of the water outlet panel 1, and the control housing 31 is integrally formed with the water outlet panel 1, but the disclosure is not limited thereto.

The adapter member 2 comprises an adapter housing 24 defining a cavity 241, and the adapter housing 24 comprises the water inlet 21, the first water outlet 22, and the second water outlet 23. The water inlet 21 of the adapter member 2 is disposed with a first one of first connectors 211, and the first water outlet 22 of the adapter member 2 is disposed with a first one of second connectors 221. The pull-out pipe 5 comprises a first pipe body 51 and a second pipe body 52. A first end of the first pipe body 51 is connected to the water outlet of the pull-out faucet 200, and a second end of the first pipe body 51 is disposed with a second one of the second connectors 221. A first end of the second pipe body 52 is connected to the water outlet terminal 7 of the pull-out faucet 200, and a second end of the second pipe body 52 is disposed with a second one of the first connectors 211. The first connectors 211 are configured to be detachably connected to the second connectors 221. Accordingly, the water outlet panel assembly 100 may be detached from or connected to the pull-out pipe 5, and the second one of the second connectors 221 at the second end of the first pipe body 51 may be connected to the second one of the first connectors 211 at the second end of the second pipe body 52 when the water outlet panel assembly 100 is detached from the pull-out pipe 5. When the water outlet panel assembly 100 is connected to the pull-out pipe 5, the second one of the second connectors 221 at the second end of the first pipe body 51 is connected to the first one of the first connectors 211 at the water inlet 21, and the second one of the first connectors 211 at the second end of the second pipe body 52 is connected to the first one of the second connectors 221 at the second water outlet 23. Therefore, the adapter member 2 can be conveniently connected to the pull-out pipe 5. The first connectors 211 and the second connectors 221 may be conventional connection structures, such as snap connection structures, screw connection structures, etc.

The adapter member 2 further comprises a movable switching member 25 and an elastic member 26. The cavity 241 is respectively connected to the water inlet 21, the first water outlet 22, and the second water outlet 23. The movable switching member 25 is movably disposed in the cavity 241 to move between a first position for blocking the first water outlet 22 and a second position for unblocking the first water outlet 22. The elastic member 26 abuts the movable switching member 25. When the second water outlet 23 is controlled not to be in communication with the water outlet port 14 by the control member 3, a water pressure in the cavity 241 pushes the movable switching member 25 to overcome an elastic force of the elastic member 26 so as to enable the movable switching member 25 to be moved to the second position. When the second water outlet 23 is controlled to be in communication with the water outlet port 14 by the control member 3, the elastic force of the elastic member 26 pushes the movable switching member 25 to be moved to the first position. When the second water outlet 23 is controlled not to be in communication with the water outlet port 14 by the control member 3, a water flow between the second water outlet 23 and the water outlet port 14 is stopped, and the water pressure in the cavity 241 pushes the movable switching member 25 to overcome the elastic force so as to enable the movable switching member 25 to be moved to the second position. When the second water outlet 23 is controlled to be in communication with the water outlet port 14 by the control member 3, the water flow flows between the second water outlet 23 and the water outlet port 14, and the elastic force of the elastic member 26 pushes the movable switching member 25 to be moved to the first position.

The movable switching member 25 comprises a first bearing surface 251 facing the second water outlet 23 and a second bearing surface 252 facing the first water outlet 22, and an area of the first bearing surface 251 is larger than an area of the second bearing surface 252. When the second water outlet 23 is not in communication with the water outlet port 14, a water pressure in the second water outlet 23 is the same as a water pressure in the cavity 241, and the area of the first bearing surface 251 is larger than the area of the second bearing surface 252, so that the water pressure acting on the first bearing surface 251 is larger than the water pressure acting on the second bearing surface 252 to enable the movable switching member 25 to be pushed.

The movable switching member 25 comprises a shaft 253, a first sealing gasket 254, and a second sealing gasket 255. The shaft 253 is moved to drive the first sealing gasket 254 to block the first water outlet 22, and the second sealing gasket 255 comprises the first bearing surface 251 and the second bearing surface 252. The first sealing gasket 254 and the second sealing gasket 255 are coaxially disposed at two ends of the shaft 253. In this embodiment, the cavity 241 comprises a first opening connected to the first water outlet 22 and a second opening connected to the second water outlet 23. The second bearing surface 252 may abut the second opening to block a connection between the cavity 241 and the second water outlet 23, and the first sealing gasket 254 may abut the first opening to block the first water outlet 22.

In this embodiment, the pull-out pipe 5 comprises a droop section 53 connected to the water outlet of the pull-out faucet 200 and a rising section 54 connected to the water outlet terminal 7 of the pull-out faucet 200. The water inlet 21 and the first water outlet 22 are detachably connected to the droop section 53 of the pull-out pipe 5 of the pull-out faucet 200. When the pull-out pipe 5 is pulled out, the rising section 54 rises and does not affect the droop section 53, so that the loosening and other problems caused by frequent movement of the adapter member 2 can be prevented.

Referring to the figures, in some constructions, the water outlet panel 1 comprises a through hole 16 extending through the top wall 11 and the bottom wall 13, and the bottom of the faucet body 6 of the pull-out faucet 200 is adapted to be connected to the through hole 16. Of course, the water outlet panel 1 may not comprises the through hole 16 to achieve a clean appearance of the water outlet panel 1.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A water outlet panel assembly configured to be connected to a pull-out faucet, comprising:
   a water outlet panel,
   an adapter member, and
   a control member, wherein:
      the water outlet panel is detachably connected to a faucet body of the pull-out faucet,
      the water outlet panel comprises a water outlet port,
      the adapter member comprises a water inlet, a first water outlet, and a second water outlet,
      the water inlet and the first water outlet are detachably connected to a pull-out pipe of the pull-out faucet,
      the control member is connected to the second water outlet and the water outlet port of the water outlet panel, and the control member controls the second water outlet to be selectively in communication with the water outlet port,
      the first water outlet is controlled to be closed by the adapter member in response to the second water outlet being controlled, by the control member, to be in communication with the water outlet port, and
      the first water outlet is controlled to be opened by the adapter member in response to the second water outlet being controlled, by the control member, not to be in communication with the water outlet port.

2. The water outlet panel assembly configured to be connected to the pull-out faucet according to claim 1, wherein:
   the water inlet of the adapter member is disposed with a first one of first connectors,
   the first water outlet of the adapter member is disposed with a first one of second connectors,
   the pull-out pipe comprises a first pipe body and a second pipe body,
   a first end of the first pipe body is connected to a water outlet of the pull-out faucet,
   a second end of the first pipe body is disposed with a second one of the second connectors,
   a first end of the second pipe body is connected to a water outlet terminal of the pull-out faucet,
   a second end of the second pipe body is disposed with a second one of the first connectors, and
   the first connectors are configured to be detachably connected to the second connectors.

3. The water outlet panel assembly configured to be connected to the pull-out faucet according to claim 1, wherein:
   the adapter member comprises a cavity, a movable switching member, and an elastic member,
   the cavity is respectively connected to the water inlet, the first water outlet, and the second water outlet,
   the movable switching member is movably disposed in the cavity to move between a first position for blocking the first water outlet and a second position for unblocking the first water outlet,
   the elastic member abuts the movable switching member,
   the movable switching member is pushed by a water pressure in the cavity to overcome an elastic force of the elastic member so as to enable the movable switching member to be moved to the second position in response to the second water outlet being controlled, by the control member, not to be in communication with the water outlet port, and
   the movable switching member is pushed by the elastic force of the elastic member to be moved to the first position in response to the second water outlet being controlled, by the control member, to be in communication with the water outlet port.

4. The water outlet panel assembly configured to be connected to the pull-out faucet according to claim 3, wherein:
   the movable switching member comprises a first bearing surface facing the second water outlet and a second bearing surface facing the first water outlet, and
   an area of the first bearing surface is larger than an area of the second bearing surface.

5. The water outlet panel assembly configured to be connected to the pull-out faucet according to claim 4, wherein:
   the movable switching member comprises a shaft, a first sealing gasket, and a second sealing gasket,
   the shaft is configured to be moved to drive the first sealing gasket to block the first water outlet,
   the second sealing gasket comprises the first bearing surface and the second bearing surface, and
   the first sealing gasket and the second sealing gasket are coaxially disposed at two ends of the shaft.

6. The water outlet panel assembly configured to be connected to the pull-out faucet according to claim 1, wherein:
   the pull-out pipe comprises a droop section connected to a water outlet of the pull-out faucet and a rising section connected to a water outlet terminal of the pull-out faucet, and
   the water inlet and the first water outlet are detachably connected to the droop section of the pull-out pipe of the pull-out faucet.

7. The water outlet panel assembly configured to be connected to the pull-out faucet according to claim 1, wherein:
   the water outlet panel comprises a top wall, a surrounding wall, and a bottom wall,
   the surrounding wall comprises the water outlet port,
   the bottom wall comprises a water inlet port,
   the control member is connected to the water inlet port, and
   the water outlet port comprises a plurality of water outlet holes arranged at intervals.

8. The water outlet panel assembly configured to be connected to the pull-out faucet according to claim 1, wherein:
   the water outlet panel comprises a through hole penetrating therethrough,
   a bottom of the faucet body of the pull-out faucet is configured to be connected to the through hole.

9. The water outlet panel assembly configured to be connected to the pull-out faucet according to claim 2, wherein:
   the adapter member comprises a cavity, a movable switching member, and an elastic member,
   the cavity is respectively connected to the water inlet, the first water outlet, and the second water outlet,
   the movable switching member is movably disposed in the cavity to move between a first position for blocking the first water outlet and a second position for unblocking the first water outlet,
   the elastic member abuts the movable switching member,
   the movable switching member is pushed by a water pressure in the cavity to overcome an elastic force of the elastic member so as to enable the movable switching member to be moved to the second position in response to the second water outlet being controlled, by the control member, not to be in communication with the water outlet port, and the movable switching member is pushed by the elastic force of the elastic member to be moved to the first position in response to the second water outlet being controlled, by the control member, to be in communication with the water outlet port.

10. The water outlet panel assembly configured to be connected to the pull-out faucet according to claim 9, wherein:
the movable switching member comprises a first bearing surface facing the second water outlet and a second bearing surface facing the first water outlet, and
an area of the first bearing surface is larger than an area of the second bearing surface.

11. The water outlet panel assembly configured to be connected to the pull-out faucet according to claim 10, wherein:
the movable switching member comprises a shaft, a first sealing gasket, and a second sealing gasket,
the shaft is configured to be moved to drive the first sealing gasket to block the first water outlet,
the second sealing gasket comprises the first bearing surface and the second bearing surface, and
the first sealing gasket and the second sealing gasket are coaxially disposed at two ends of the shaft.

12. The pull-out faucet comprising the faucet body and the water outlet panel assembly according to claim 1.

13. The pull-out faucet according to claim 12, wherein:
the water inlet of the adapter member is disposed with a first one of first connectors,
the first water outlet of the adapter member is disposed with a first one of second connectors,
the pull-out pipe comprises a first pipe body and a second pipe body,
a first end of the first pipe body is connected to a water outlet of the pull-out faucet,
a second end of the first pipe body is disposed with a second one of the second connectors,
a first end of the second pipe body is connected to a water outlet terminal of the pull-out faucet,
a second end of the second pipe body is disposed with a second one of the first connectors, and
the first connectors are configured to be detachably connected to the second connectors.

14. The pull-out faucet according to claim 12, wherein:
the adapter member comprises a cavity, a movable switching member, and an elastic member,
the cavity is respectively connected to the water inlet, the first water outlet, and the second water outlet,
the movable switching member is movably disposed in the cavity to move between a first position for blocking the first water outlet and a second position for unblocking the first water outlet,
the elastic member abuts the movable switching member,
the movable switching member is pushed by a water pressure in the cavity to overcome an elastic force of the elastic member so as to enable the movable switching member to be moved to the second position in response to the second water outlet being controlled, by the control member, not to be in communication with the water outlet port, and
the movable switching member is pushed by the elastic force of the elastic member to be moved to the first position in response to the second water outlet being controlled, by the control member, to be in communication with the water outlet port.

15. The pull-out faucet according to claim 14, wherein:
the movable switching member comprises a first bearing surface facing the second water outlet and a second bearing surface facing the first water outlet, and
an area of the first bearing surface is larger than an area of the second bearing surface.

16. The pull-out faucet according to claim 15, wherein:
the movable switching member comprises a shaft, a first sealing gasket, and a second sealing gasket,
the shaft is configured to be moved to drive the first sealing gasket to block the first water outlet,
the second sealing gasket comprises the first bearing surface and the second bearing surface, and
the first sealing gasket and the second sealing gasket are coaxially disposed at two ends of the shaft.

17. The pull-out faucet according to claim 12, wherein:
the pull-out pipe comprises a droop section connected to a water outlet of the pull-out faucet and a rising section connected to a water outlet terminal of the pull-out faucet, and
the water inlet and the first water outlet are detachably connected to the droop section of the pull-out pipe of the pull-out faucet.

18. The pull-out faucet according to claim 12, wherein:
the water outlet panel comprises a top wall, a surrounding wall, and a bottom wall,
the surrounding wall comprises the water outlet port,
the bottom wall comprises a water inlet port,
the control member is connected to the water inlet port, and
the water outlet port comprises a plurality of water outlet holes arranged at intervals.

19. The pull-out faucet according to claim 12, wherein:
the water outlet panel comprises a through hole penetrating therethrough, and
a bottom of the faucet body of the pull-out faucet is configured to be connected to the through hole.

\* \* \* \* \*